United States Patent [19]

Liston

[11] Patent Number: 5,024,773

[45] Date of Patent: * Jun. 18, 1991

[54] METHODS FOR PREPARING, GROUP II METAL OVERBASED SULFURIZED ALKYLPHENOLS

[75] Inventor: Thomas V. Liston, San Rafael, Calif.

[73] Assignee: Chevron Research Company, San Francisco, Calif.

[ * ] Notice: The portion of the term of this patent subsequent to Nov. 20, 2007 has been disclaimed.

[21] Appl. No.: 353,288

[22] Filed: May 17, 1989

Related U.S. Application Data

[63] Continuation of Ser. No. 195,559, May 16, 1988, Pat. No. 4,971,710, which is a continuation of Ser. No. 921,299, Oct. 21, 1986, Pat. No. 4,744,921.

[51] Int. Cl.$^5$ ................ C10M 129/00; C10M 135/00
[52] U.S. Cl. .................................... 252/42.7; 252/33; 252/33.2; 252/33.4; 252/39; 568/716; 568/780
[58] Field of Search ..................... 252/42.7, 33, 33.2, 252/33.4, 39, 51.5 A; 548/545; 568/716, 780

[56] References Cited

U.S. PATENT DOCUMENTS

| | | | |
|---|---|---|---|
| 2,744,083 | 5/1956 | Moody et al. | 252/33.4 |
| 3,172,892 | 3/1965 | Le Suer | 252/51.5 A |
| 3,219,666 | 11/1965 | Norman | 252/51.5 A |
| 3,367,867 | 2/1968 | Abbott et al. | 252/33.4 |
| 3,390,082 | 6/1968 | Le Suer | 252/51.5 A |
| 3,437,595 | 4/1969 | Coupland | 252/42.7 |
| 3,725,381 | 4/1973 | Sakai et al. | 252/42.7 |
| 3,923,670 | 12/1975 | Crawford | 252/42.7 |
| 4,100,085 | 7/1978 | Peditto et al. | 252/42.7 |
| 4,123,371 | 10/1978 | Hori et al. | 252/42.7 |
| 4,212,752 | 7/1980 | Peditto et al. | 252/42.7 |
| 4,228,022 | 10/1980 | Lowe et al. | 252/42.7 |
| 4,293,431 | 10/1981 | Demeuers et al. | 252/42.7 |
| 4,382,004 | 5/1983 | Tassara | 252/42.7 |
| 4,518,807 | 5/1985 | Hori et al. | 568/716 |
| 4,744,921 | 5/1988 | Liston | 252/42.7 |

*Primary Examiner*—Margaret B. Medley
*Attorney, Agent, or Firm*—C. J. Caroli; R. C. Gaffney

[57] ABSTRACT

The present invention is directed toward a method for preparing Group II metal overbased sulfurized alkylphenols. In particular, the present invention employs a sulfurization catalyst in the preparation of Group II metal overbased sulfurized alkylphenols. Use of a sulfurization catalyst in this preparation results in a product generally characterized as having lower crude sediment, a higher Total Base Number and lower viscosity than a similar product prepared without using a sulfurization catalyst.

11 Claims, No Drawings

METHODS FOR PREPARING, GROUP II METAL OVERBASED SULFURIZED ALKYLPHENOLS

This is a continuation of application Ser. No. 195,559, filed May 16, 1988, now U.S. Pat. No. 4,971,710, which is a continuation of Ser. No. 921,299, filed Oct. 21, 1986, now U.S. Pat. No. 4,744,921.

BACKGROUND OF THE INVENTION

1. Field of the Invention

The present invention is directed toward a method for preparing Group II metal overbased sulfurized alkylphenols. In particular, the present invention is directed toward the discovery that the use of a sulfurization catalyst during the preparation of Group II metal overbased sulfurized alkylphenols results in a product generally characterized as having lower crude sediment, a higher Total Base Number (TBN) and lower viscosity than similar products prepared without a sulfurization catalyst.

2. Prior Art

Group II metal overbased sulfurized alkylphenols are useful lubricating oil additives which impart detergency and dispersancy properties to the lubricating oil composition as well as providing for an alkalinity reserve in the oil. Alkalinity reserve is necessary in order to neutralize acids generated during engine operation. Without this alkalinity reserve, the acids so generated would result in harmful engine corrosion.

One method of preparing Group II metal overbased sulfurized alkylphenols is described in U.S. Pat. No. 3,178,368, where an alkylphenol, a sulfonate, a high molecular weight alcohol, lubricating oil and sulfur are combined and heated with agitation. Hydrated lime is then added, the system heated and ethylene glycol added. Water of reaction is removed, the mixture cooled, and carbon dioxide added. Uncombined $CO_2$ is removed and the reaction vessel is heated to remove ethylene glycol, water and the high molecular alcohol. The product is overbased by the incorporation therein of hydrated lime and carbon dioxide.

U.S. Pat. No. 3,367,867 discloses a similar process to that of U.S. Pat. No. 3,178,368 with the exception that this reference discloses that the use of alkyl groups on the alkylphenol which are mixtures of straight- and branched-chain alkyl results in products having suitable viscosities as well as antifoaming properties.

I have now discovered a novel method for preparing Group II metal overbased sulfurized alkylphenols. In particular, in the method of the instant invention, Group II metal overbased sulfurized alkylphenols are prepared by employing a "sulfurization catalyst" in the preparation of these additives. A particularly preferred catalyst is 2-mercaptobenzothiazole (MBT) and derivatives thereof.

To my knowledge, the use of a sulfurization catalyst in the preparation of Group II metal overbased sulfurized alkylphenols is not taught in the prior art. Prior art references include U.S. Pat. No. 4,100,085 which describes the use of ammonia or ammonium hydroxide as a promoter in the synthesis of overbased sulfurized alkylphenols. Likewise, U.S. Pat. No. 4,212,752 describes the use of certain amino promoters, such as primary and secondary alkylamines, polyalkyleneamines, amino acids, etc., in the synthesis of overbased sulfurized alkylphenols.

SUMMARY OF THE INVENTION

The present invention is directed toward a method for preparing Group II metal overbased sulfurized alkylphenols. In particular, the method of the present invention comprises:

(a) combining into an inert hydrocarbon diluent an alkylphenol wherein the alkyl group contains a sufficient number of carbon atoms to render oil-soluble the resulting Group II metal overbased sulfurized alkylphenol, an oil-soluble Group II metal overbased natural or synthetic hydrocarbyl sulfonate, a sulfurization catalyst, and an alkanol of at least 8 carbon atoms; wherein the oil-soluble Group II metal overbased natural or synthetic hydrocarbyl sulfonate is employed at from about 1 to 20 weight percent to the alkylphenol, the sulfurization catalyst is employed at from about 0.5 to 10 weight percent to the alkylphenol, and the alkanol of at least 8 carbon atoms is employed at a molar ratio to the alkylphenol of from about 0.5 to about 5;

(b) heating the system to a temperature of from about 90° C. to about 155° C.;

(c) combining into the reaction system a Group II metal oxide, hydroxide or $C_1$–$C_6$ alkoxide and sulfur at a temperature sufficient to effect sulfurization of the alkylphenol followed by addition at from about 145° C. to about 165° C. of a $C_2$–$C_4$ alkylene glycol; wherein the Group II metal oxide, hydroxide or $C_1$–$C_6$ alkoxide is employed at a molar ratio to the alkylphenol of from about 1 to about 4, sulfur is employed at a molar ratio to the alkylphenol of from about 1.5 to about 4, the $C_2$–$C_4$ alkylene glycol is employed at a molar ratio to the alkylphenol of from about 1 to about 4;

(d) heating at a temperature sufficient to effect removal of a portion of the water in the system;

(e) heating the system to a temperature of from about 160° C. to about 190° C.;

(f) combining into the reaction system carbon dioxide wherein carbon dioxide is employed at a molar charge to the alkylphenol of from about 1 to 3; and (g) heating the system under reduced pressure at a temperature and pressure sufficient to remove a portion of the water, $C_2$–$C_4$ alkylene glycol and the alkanol of at least 8 carbon atoms.

In step (c), after combination of the Group II metal oxide, hydroxide or $C_1$–$C_6$ alkoxide and sulfur, the temperature of the system is preferably raised, if necessary, from that of step (b) to about 150° C. to effect sulfurization of the alkylphenol. Also, in step (c), the $C_2$–$C_4$ alkylene glycol addition is preferably conducted at from about 150° C. to about 165° C. and even more preferably at from 150° C. to 160° C.

Step (d) is preferably conducted at a temperature sufficient to effect removal of a portion of the water in the reaction system without additionally removing significant amounts, i.e., greater than about 15%, of either the alkanol of at least 8 carbon atoms and the $C_2$–$C_4$ alkylene glycol. Step (d) is more preferably conducted at from about 155° C. to about 165° C. and most preferably at about 160° C.

Step (e) is preferably conducted at from about 160° C. to about 180° C.

Step (g) is preferably conducted at from about 175° C. to about 200° C. and at pressures from about 10 to about 50 mm of mercury.

The alkyl group of the alkylphenol employed in the method of the instant invention contains a sufficient number of carbon atoms to render the Group II metal over-based sulfurized alkylphenol oil-soluble. In general, alkyl groups of about 8 carbon atoms or more are sufficient to render the Group II metal overbased sulfurized alkylphenol oil-soluble.

In one preferred embodiment, the alkyl group of said alkylphenol contains from 25 to 100 mole percent predominantly straight-chain alkyl groups of from 15 to 35 carbon atoms and from 75 to 0 mole percent of the alkyl groups are polypropenyl of from 9 to 18 carbon atoms. More preferably, the alkyl group of said alkylphenol contains from 35 to 100 mole percent predominantly straight-chain alkyl groups of from 15 to 35 carbon atoms and from 65 to 0 mole percent of the alkyl groups are polypropenyl of from 9 to 18 carbon atoms. In yet another preferred embodiment, the alkyl group of said alkylphenol contains from 40 to 70 mole percent predominantly straight-chain alkyl groups of from 15 to 35 carbon atoms and from 60 to 30 mole percent of the alkyl groups are polypropenyl of from 9 to 18 carbon atoms. Most preferably, the alkyl group of said alkylphenol contains approximately 50 mole percent predominantly straight-chain alkyl groups of from 15 to 35 carbon atoms and approximately 50 mole percent of the alkyl groups are polypropenyl of from 9 to 18 carbon atoms.

The process of the instant invention is particularly useful for preparing highly overbased sulfurized alkylphenols possessing a Total Base Number of greater than about 300; and preferably from about 300 to 400, more preferably from 315 to 400; even more preferably from 315 to 360; and most preferably 325 to 360.

As used herein, the term "Group II metal" means calcium, barium, magnesium, and strontium. Preferably, the Group II metal is selected from the group consisting of calcium, magnesium, barium, and mixtures thereof. Most preferably, the Group II metal is calcium.

As used herein, the term "Total Base Number" or "TBN" refers to the amount of base equivalent to milligrams of KOH in 1 gram of sample. Thus, higher TBN numbers reflect more alkaline products and therefore a greater alkalinity reserve.

The term "hydrolytically stable" as used in conjunction with Group II metal overbased sulfurized alkylphenols means that compositions containing these products will lose less than about 25% of their Total Base Number in a modified ASTM D 2619 test. This test, as modified, measures the hydrolytic stability of a product by measuring its base loss upon exposure to moisture. Greater base loss reflects poorer hydrolytic stability. Hydrolytic stability of the Group II metal overbased sulfurized alkylphenols is an extremely important property particularly in marine crankcase use where water exposure is common. See van der Horst, Lubricant Engineering, "Development of Modern Lubricants for Medium-Speed Marine Diesel Engines" (1977); Thomas et al., "Modern Marine Diesel Engine Lubricants and their Development", Second International Lubricant Symposium, Cairo, Egypt (1979).

In the process of preparing overbased sulfurized alkylphenols, only the Group II metal sulfurized alkylphenol is capable of being overbased. Accordingly, it is desirable to maximize the amount of Group II metal sulfurized alkylphenol in the reaction process. On the other hand, unsulfurized alkylphenol can form a Group II metal salt but this salt cannot be overbased by addition of $Ca(OH)_2$ (and related materials) and carbon dioxide. Accordingly, it is desirable to minimize the amount of Group II metal unsulfurized alkylphenol in the reaction process.

The term "actives" as applied to the compositions of this invention refers to the Group II metal alkylphenol and the Group II metal sulfurized alkylphenol whereas the term "inactives" refers to unreacted alkylphenol as well as any diluent oil contained in the composition.

The amount of Group II metal sulfurized alkylphenol as well as the amount of Group II metal alkylphenol contained in the actives can be determined by standard analytical techniques. One technique employed herein utilizes dialysis coupled with $^1H$—NMR.

As used herein, the term "predominantly straight chain alkyl" means a predominantly linear alkyl group which may contain some branching in the molecular structure.

DETAILED DESCRIPTION OF THE INVENTION

In the method of this invention, the Group II metal overbased sulfurized alkylphenols are prepared in processes similar to those previously described in the art with the exception that a sulfurization catalyst is also employed. Use of a sulfurization catalyst in the process of this invention results in products generally characterized as having lower crude sediment, higher Total Base Numbers (TBN), and lower viscosities than products prepared by the same process but without use of the sulfurization catalyst.

The method of the instant invention is particularly useful for preparing 300+TBN products of acceptable viscosity which are also hydrolytically stable. Prior art processes for preparing Group II metal overbased sulfurized alkylphenols can provide products having a Total Base Number as high as 300 or more, some of which have acceptable viscosities but some of these products are hydrolytically unstable. The reasons for the inability of prior art processes to consistently produce hydrolytically stable high TBN overbased sulfurized alkylphenols are not readily apparent.

Upon careful examination of this problem and without limitation to this theory, it appears that the hydrolytic instability of high TBN products is due in part to large amounts of unsulfurized Group II metal alkylphenol contained in the actives. It appears that this incomplete sulfur incorporation is much more prevalent when high molar charges of hydrated lime to alkylphenol are used, i.e., greater than 2. That is to say, in the process of preparing an overbased sulfurized alkylphenol, hydrated lime, sulfur and alkylphenol are charged into a reaction system. Sufficient sulfur is employed to convert all of the alkylphenol to sulfurized alkylphenol. At a molar charge of 2 or less of hydrated lime to alkylphenol, the alkylphenol is generally converted to calcium sulfurized alkylphenol whereas at molar charges of greater than 2, the product contains large amounts of unsulfurized calcium alkylphenol. On the other hand, molar charges of hydrated lime to alkylphenol of greater than 2 are generally required to achieve 300+TBN products. Thus, the problem is readily apparent. With all other factors held constant such as sulfur charge, $CO_2$ charge, etc., to arrive at 300+ TBN products requires molar charges of hydrated lime to alkylphenol in excess of 2 which invariably results in large amounts of unsulfurized calcium alkylphenol which in turn reduces the TBN incorporation because it cannot be overbased and tends to increase the viscosity as well as the hydrolytic instability of the product. The incomplete sulfurization of the alkylphenol at high molar charges of hydrated lime to alkylphenol, i.e., >2, was heretofore unrecognized and for which an explanation is not readily available.

In any event, I have now discovered that the use of a sulfurization catalyst in those processes employing greater than 2 equivalents of hydrated lime or other Group II metal oxide or hydroxide greatly enhances the amount of Group II metal sulfurized alkylphenol in the actives and greatly decreases the amount of unsulfurized Group II metal alkylphenol in the actives. The resulting high TBN products are characterized by containing at least about 90 mole percent and preferably at least 95 mole percent of Group II metal sulfurized alkylphenols in the actives. In the converse, these products by necessity will contain at most about 10 mole percent and preferably at most about 5 mole percent of the unsulfurized Group II metal alkylphenols in the actives. Because of the decrease in the amount of unsulfurized Group II metal alkylphenol in the actives, higher TBN products are possible. Moreover by employing a sulfurization catalyst, the resulting products additionally have improved hydrolytic stability, lower viscosity, as well as less crude sediment than products produced without a sulfurization catalyst.

In accordance with this invention, it has been discovered that oil-soluble, Group II metal overbased sulfurized alkylphenols can be prepared by reacting in an inert hydrocarbon diluent appropriate amounts of a sulfurization catalyst, sulfur, alkylphenol, a Group II metal oxide, hydroxide or $C_1$–$C_6$ alkoxide followed by carbonation with $CO_2$. The reaction system will also contain a $C_2$–$C_4$ alkylene glycol (such as 1,3-propylene glycol, 1,4-butylene glycol, ethylene glycol, etc., but preferably the $C_2$–$C_4$ alkylene glycol is ethylene glycol), a Group II metal overbased natural or synthetic hydrocarbyl sulfonate and a high molecular weight alcohol, i.e., an alkanol of at least 8 carbon atoms. The resulting products of this reaction are termed by the art as a Group II metal overbased sulfurized alkylphenols.

The sulfurization catalyst catalyzes the sulfur incorporation onto the alkylphenol. Suitable sulfurization catalysts include 2-mercaptobenzothiazole (MBT) and derivatives thereof such as bis(2,2'-benzothiazolyl) disulfide; 2(3H)-benzothiazolethione zinc salt; 2-benzothiazolyl-N,N'-diethylthiocarbamyl sulfide; 4-morpholinyl-2-benzothiazole disulfide; etc. Another suitable class of sulfurization catalysts include zinc dihydrocarbyl dithiophosphates wherein each hydrocarbyl is independently selected such that the dihydrocarbyl group contains from 6 to 30 carbon atoms, i.e., zinc diisopropyl dithiophosphate; zinc di-n-butyldithiophosphate, zinc di-(2-ethylhexyl)dithiophosphate, etc. Hydrocarbyl as used in zinc dihydrocarbyl dithiophosphate means an organic radical composed only of carbon and hydrogen and includes alkyl, aryl, alkaryl, aralkyl, etc. Other metals such as copper, barium, magnesium, etc., are considered equivalent to zinc in the zinc dihydrocarbyl dithiophosphates used as sulfurization catalysts.

Other suitable classes of sulfurization catalysts include thioureas, thiurams, calcium polysulfide and the like. Specific embodiments of these catalysts include N,N'-dibutylthiourea; ethylenethiourea; trimethylthiourea, dipentamethylenethiuram disulfide, dipentamethylenethiourea tetrasulfide; dipentamethylenethiourea hexasulfide; etc.

The sulfurization catalyst is generally employed at from about 0.5 to 10 weight percent to the alkylphenol in the reaction system and preferably at from about 1 to 2 weight percent. In a preferred embodiment, the sulfurization catalyst is added to the reaction mixture as a liquid. This can be accomplished by dissolving the sulfurization catalyst in molten sulfur or in the alkylphenol as a premix to the reaction.

Sulfur is generally employed at from about 1.5 to 4 moles per mole of the alkylphenol in the reaction system; preferably at from about 2 to 4 moles per mole of the alkylphenol and even more preferably at from about 2 to 3 moles per mole of alkylphenol. All allotropic forms of sulfur can be used. Alternatively, in place of sulfur, sulfur monochloride may be employed. For the purposes of this invention, sulfur monochloride is considered equivalent to sulfur. The sulfur may be employed either as molten sulfur or as a solid.

The Group II metal oxide, hydroxide or $C_1$–$C_6$ alkoxide used to prepare the Group II metal alkylphenol includes the oxides, hydroxides and alkoxides of calcium, strontium, barium or magnesium. However, calcium, barium and magnesium are preferred whereas calcium is most preferred. The Group II metal oxide, hydroxide, or $C_1$–$C_6$ alkoxide is employed at a molar charge to the alkylphenol of from about 1.5 to about 4; although preferably at from greater than 2 to 4; and even more preferably from greater than 2 to 3.

Carbon dioxide is added to the reaction system in conjunction with the Group II metal oxide, hydroxide or $C_1$–$C_6$ alkoxide to form overbased products and is generally employed from about 1 to 3 moles per mole of alkylphenol, although preferably from about 2 to 3 moles per mole of alkylphenol charged to the reaction system. Preferably, the amount of $CO_2$ incorporated into the Group II metal overbased sulfurized alkylphenol is such that the $CO_2$ to calcium weight ratio is between 0.65 to 0.73.

The alkylphenol employed in this invention is represented by the formula:

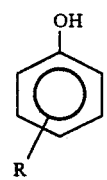

I wherein R is an alkyl group containing sufficient number of carbon atoms to render the resulting Group II metal overbased sulfurized alkylphenol oil-soluble.

Preferably, R is alkyl wherein from about 25 to 100 mole percent of the alkyl group is predominantly straight-chain alkyl of from 15 to 35 carbon atoms and from about 75 to 0 mole percent of the alkyl group is polypropenyl of from 9 to 18 carbon atoms although more preferably R is alkyl wherein from about 35 to 100 mole percent of the alkyl group is predominantly straight chain of from 15 to 35 carbon atoms and from about 65 to 0 mole percent of the alkyl group is polypropenyl of from 9 to 18 carbon atoms. Use of increasing amounts of predominantly straight chain alkyl results in high TBN products generally characterized by lower viscosities. On the other hand, while polypropenylphenols are generally more economical than predominantly straight chain alkylphenols, use of greater than 75 mole percent polypropenylphenol in the preparation of Group II metal overbased sulfurized alkylphenol generally results in products of unacceptably high viscosities. However, use of a mixture of from 75 mole percent or less of polypropenylphenol of from 9 to 18 carbon atoms and from 25 mole percent or more of predominantly straight chain alkylphenol of from 15 to 35 carbon atoms allows for more economical products of acceptable viscosities.

The alkylphenols of Formula I above are prepared by reacting the appropriate olefin or olefin mixture with phenol in the presence of an alkylating catalyst at a temperature of from about 60° C. to 200° C, and preferably 125° C. to 180° C. either neat or in an essentially inert solvent at atmospheric pressure. A preferred alkylating catalyst is a sulfonic acid catalyst such as Amberlyst 15 ® available from Rohm and Haas, Philadelphia, Pennsylvania. Molar ratio of reactants may be used. Alternatively, molar excess of phenol can be employed, i.e., 2-2.5 equivalents of phenol for each equivalent of olefin with unreacted phenol recycled. The latter process maximizes monoalkylphenol. Examples of inert solvents include benzene, toluene, chlorobenzene and 250 thinner which is a mixture of aromatics, paraffins and naphthenes.

The alkylphenols employed in this invention are either ortho alkylphenols of the formula:

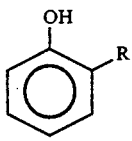

or para-alkylphenols of the formula:

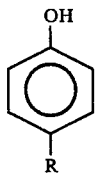

Preferably, R is predominantly para with no more than about 50 mole percent of the R alkyl group being in the ortho position; and more preferably no more than about 35 mole percent of the alkyl group being in the ortho position. It is believed that p-alkylphenols, III, facilitate the preparation of highly overbased Group II metal sulfurized alkylphenols. Accordingly, it is desirable to employ an olefin which results in maximum para alkylphenol content in the alkylphenol. In this regard, while polypropene generally adds in the para position, olefins containing no branching will add at both the ortho or para position. One method of enhancing the para content of the alkylphenol prepared from straight chain olefins is by use of a predominantly straight chain olefin fractions containing some branching in the molecular structure at the double bond such as structures IV and V

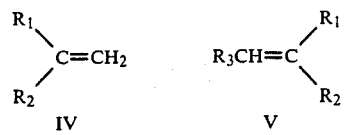

(vinylidine)    (trisubstituted vinyl)

wherein $R_1$, $R_2$ and $R_3$ form the remainder of the olefin. While being predominantly straight chain, the branched portion of the molecular structure allows for formation of a tertiary carbonium ion during the alkylation process. Without being limited to any theory, it is believed that the steric hindrance associated with a tertiary carbonium ion inhibits ortho alkylation and thereby results in enhanced para substitution. Suitable predominantly straight chain olefins are those wherein about 75 to 100 number percent and preferably about 85 to 100 number percent of the individual carbon atoms of the olefin are either primary ($CH_3$—) or secondary (—$CH_2$—). Included in the terms primary or secondary are alpha olefins (—CH=$CH_2$) and internal olefins (—CH=CH—). In the converse, such predominantly straight chain olefins can contain from 0 to about 25 number percent although preferably from 0 to about 15 number percent of tertiary carbon atoms. Included within the term tertiary are trisubstituted vinyl groups (>C=CH—) and vinylidine (>C=$CH_2$).

Predominantly straight chain olefin fractions are commercially available products such as $C_{18}$-$C_{30}$ olefins, available from Ethyl Corporation, Baton Rouge, Louisiana. These olefins are predominantly straight chain in that from 80 to 100 number percent of the carbon atoms in the olefins are either primary or secondary. On the other hand, about 40 mole percent of the olefins contained in the olefin fraction are branched olefins. That is to say while being otherwise predominantly straight chain 40 mole percent of all of the olefins are branched in the form of trisubstituted vinyl or vinylidine structure. Likewise, $C_{24}$-$C_{28}$ olefin fractions, available from Chevron Chemical Corporation, San Francisco, CA, are also predominantly straight-chain but contain about 40 mole percent or more branched olefin, containing predominantly vinylidine olefin. Straight chain olefins, containing less than about 5 mole percent branched olefins, are available from Shell Chemical Company, Houston, Texas.

This is the appropriate time to distinguish between "predominantly straight-chain olefins containing 80 to 100 number percent of either primary or secondary carbon atoms in the olefin" and a "predominantly straight-chain olefin fraction wherein about 40 mole percent of the olefins are branched". In the first case, the olefin is viewed on a molecular basis and requires that at least 80 number percent of the carbon atoms be primary or secondary. In this case, a branched olefin such as trisubstituted vinyl or vinylidine is nonetheless predominantly straight-chain if a sufficient number of the remaining carbon atoms are primary or secondary such that at least 80 number percent of the carbon atoms in this olefin are primary or secondary.

On the other hand, a predominantly straight-chain olefin fraction wherein about 40 mole percent of the olefins are branched as is viewed from a composition basis. That is the predominantly straight-chain olefin fraction can contain olefins such as alpha olefins, internal olefins, trisubstituted vinyl and vinylidine. When viewing the entire predominantly straight-chain olefin fraction, 40 mole percent of the olefins are branched, i.e., either trisubstituted vinyl or vinylidine, whereas the remainder are either alpha olefins or internal olefins.

The reaction to prepare the Group II metal overbased sulfurized alkylphenols of this invention also employs a $C_2$–$C_4$ alkylene glycol, preferably ethylene glycol, a high molecular weight alcohol (generally decyl alcohol) and a Group II metal overbased natural or synthetic hydrocarbyl sulfonate.

The $C_2$–$C_4$ alkylene glycol is generally employed at a molar charge to the alkylphenol of about 1 to 4, although preferably this molar charge is from about 2 to 3. Alternatively, 2-ethylhexanol may be employed in conjunction with $C_2$–$C_4$ alkylene glycol at weight ratios such as 80% by weight 2-ethylhexanol and 20% by weight ethylene glycol.

The high molecular weight alcohol, i.e., an alkanol of at least 8 carbon atoms, is employed at a molar charge to the alkylphenol from about 0.5 to 5, although preferably from about 0.5 to 4 and even more preferably from 1 to 2. Suitable alkanols of at least 8 carbon atoms include 1-octanol, 1-decanol, i.e., decyl alcohol, 2-ethylhexanol, etc.

The Group II metal overbased natural or synthetic hydrocarbyl sulfonates may be either petroleum sulfonate, synthetically alkylated aromatic sulfonates, or aliphatic sulfonates such as those derived from polyisobutylene. These sulfonates are well-known in the art. The hydrocarbyl group must have a sufficient number of carbon atoms to render the sulfonate molecule oil soluble. Preferably, the hydrocarbyl portion has at least 20 carbon atoms and may be aromatic or aliphatic, but is usually alkylaromatic. Most preferred for use are calcium, magnesium or barium sulfonates which are aromatic in character.

Certain sulfonates are typically prepared by sulfonating a petroleum fraction having aromatic groups, usually mono- or dialkylbenzene groups, and then forming the metal salt of the sulfonic acid material. Other feedstocks used for preparing these sulfonates include synthetically alkylated benzenes and aliphatic hydrocarbons prepared by polymerizing a mono- or diolefin, for example, a polyisobutenyl group prepared by polymerizing isobutene. The metallic salts are formed directly or by metathesis using well-known procedures.

The sulfonates are then overbased to yield products having Total Base Numbers up to about 400 or more by addition of carbon dioxide and a Group II metal hydroxide or oxide. Calcium hydroxide or oxide is the most commonly used material to produce the basic overbased sulfonates. Also included in the term "overbased" sulfonates are the basic natural or synthetic hydrocarbyl sulfonates prepared by utilizing an excess of Group II metal oxide or hydroxide over that which is necessary to form the neutral salts. All of these materials are well-known in the art.

The Group II metal overbased natural or synthetic hydrocarbyl sulfonate is employed at from about 1 to 20 weight percent to the alkylphenol, although preferably from about 1 to 10 weight percent. The Group II metal overbased natural or synthetic hydrocarbyl sulfonate described above are also employed in lubricating oil formulations in conjunction with the Group II metal overbased sulfurized alkylphenols; especially in marine crankcase formulations.

Alternatively, in lieu of a Group II metal overbased natural or synthetic hydrocarbyl sulfonate, an alkenyl succinimide may be employed. Alkenyl succinimides are well-known in the art. The alkenyl succinimides are the reaction product of a polyolefin polymer-substituted succinic anhydride with an amine, preferably a polyalkylene polyamine. The polyolefin polymer-substituted succinic anhydrides are obtained by reaction of a polyolefin polymer or a derivative thereof with maleic anhydride. The succinic anhydride thus obtained is reacted with the amine compound The preparation of the alkenyl succinimides has been described many times in the art. See, for example, U.S. Pat. Nos. 3,390,082; 3,219,666; and 3,172,892, the disclosure of which are incorporated herein by reference. Reduction of the alkenyl substituted succinic anhydride yields the corresponding alkyl derivative. The alkyl succinimides are intended to be included within the scope of the term "alkenyl succinimide". A product comprising predominantly mono- or bis-succinimide can be prepared by controlling the molar ratios of the reactants. Thus, for example, if one mole or amine is reacted with one mole of the alkenyl or alkyl substituted succinic anhydride, a predominantly mono-succinimide product will be prepared. If two moles of the succinic anhydride are reacted per mole of polyamine, a bis-succinimide will be prepared.

The polyisobutene from which the polyisobutene-substituted succinic anhydride is obtained by polymerizing isobutene can vary widely in its compositions. The average number of carbon atoms can range from 30 or less to 250 or more, with a resulting number average molecular weight of about 400 or less to 3,000 or more. Preferably, the average number of carbon atoms per polyisobutene molecule will range from about 50 to about 100 with the polyisobutenes having a number average molecular weight of about 600 to about 1,500. More preferably, the average number of carbon atoms are polyisobutene molecule ranges from about 60 to about 90, and the number average molecular weight ranges from about 800 to 1,300. The polyisobutene is reacted with maleic anhydride according to well-known procedures to yield the polyisobutene-substituted succinic anhydride.

In preparing the alkenyl succinimide, the substituted succinic anhydride is reacted with a polyalkylene polyamine to yield the corresponding succinimide. Each alkylene radical of the polyalkylene polyamine usually has up to about 8 carbon atoms. The number of alkylene radicals can range up to about 8. The alkylene radical is exemplified by ethylene, propylene, butylene, trimethylene, tetramethylene, pentamethylene, hexamethylene, octamethylene, etc. The number of amino groups generally, but not necessarily, is one greater than the number of alkylene radicals present in the amine, i.e., if a polyalkylene polyamine contains 3 alkylene radicals, it will usually contain 4 amino radicals. The number of amino radicals can range up to about 9. Preferably, the alkylene radical contains from about 2 to about 4 carbon atoms and all amine groups are primary or secondary. In this case, the number of amine groups exceeds the number of alkylene groups by 1. Preferably, the polyalkylene polyamine contains from 3 to 5 amine groups. Specific examples of the polyalkylene polyamines include ethylenediamine, diethylenetriamine, triethylenetetramine, propylenediamine, tripropylenetetramine, tetraethylenepentamine, trimethylenediamine, pentaethylenehexamine, di-(trimethylene)triamine, tri(hexamethylene)tetramine, etc.

When employed the amount of alkenyl succinimide used is from about 1 to 20 weight percent to the alkylphenol, although preferably from about 1 to 10 weight percent.

The reaction to prepare the Group II metal overbased sulfurized alkylphenols is conducted by the following steps.

(a) combining into an inert hydrocarbon diluent an alkylphenol wherein the alkyl group contains a sufficient number of carbon atoms to render oil-soluble the resulting Group II metal overbased sulfurized alkylphenol, an oil-soluble Group II metal overbased natural or synthetic hydrocarbyl sulfonate, a sulfurization catalyst, and an alkanol of at least 8 carbon atoms; wherein the oil-soluble Group II metal overbased natural or synthetic hydrocarbyl sulfonate is employed at from about 1 to 20 weight percent to the alkylphenol; the sulfurization catalyst is employed at from about 0.5 to 10 weight percent to the alkylphenol, and the alkanol of at least 8 carbon atoms is employed at a molar ratio to the alkylphenol of from about 0.5 to about 5;

(b) heating the system to a temperature of from about 90° C. to about 155° C.;

(c) combining into the reaction system a Group II metal oxide, hydroxide or $C_1$–$C_6$ alkoxide and sulfur at a temperature sufficient to effect sulfurization of the alkylphenol followed by addition at from about 145° C. to about 165° C. of a $C_2$–$C_4$ alkylene glycol; wherein the Group II metal oxide, hydroxide or $C_1$–$C_6$ alkoxide is employed at a molar ratio to the alkylphenol of from about 1 to about 4, sulfur is employed at a molar ratio to the alkylphenol of from about 1.5 to about 4, the $C_2$–$C_4$ alkylene glycol is employed at a molar ratio to the alkylphenol of from about 1 to about 4;

(d) heating at a temperature sufficient to effect removal of a portion of the water in the system;

(e) heating the system to a temperature of from about 160° C. to about 190° C.;

(f) combining into the reaction system carbon dioxide wherein carbon dioxide is employed at a molar charge to the alkylphenol of from about 1 to 3; and (g) heating the system under reduced pressure at a temperature and pressure sufficient to remove a portion of the water, $C_2$–$C_4$ alkylene glycol and the alkanol of at least 8 carbon atoms.

The resulting composition of this method is termed by the art as a Group II metal overbased sulfurized alkylphenol.

The inert hydrocarbon diluent employed in this method is generally lubricating oil. Suitable lubricating oil diluent include solvent refined 100N, i.e., Cit-Con 100N, and hydrotreated 100N, i.e., RLOP 100N, etc.

Step (d) involves removal of a portion of the water from the system. In this step, water is generally removed from the system until approximately 50% of the water is removed and preferably 80% to 90% or more of the water is removed from the system.

Step (g) involves heating the system under reduced pressures at a temperature and pressure sufficient to remove from the system a portion of the water, $C_2$–$C_4$ alkylene glycol and the alkanol of at least 8 carbon atoms. It is understood by those skilled in the art that the temperature required to remove a portion of the water, $C_2$–$C_4$ alkylene glycol and unreacted carbon dioxide is a function of pressure. That is lower temperatures require lower pressures to effect removal from the system of a portion of water, $C_2$–$C_4$ alkylene glycol and the alkanol of at least 8 carbon atoms. All that is required is a sufficiently high temperature and a sufficiently low pressure to effect removal. In general, temperatures of from greater than about 175° C. to about 200° C. and pressures from about 10 to about 50 mm of mercury or less have been found sufficient. Step (g) is generally continued until approximately all of the water, about 75% to about 90% of the $C_2$–$C_4$ alkylene glycol, and about 75% to about 90% of the alkanol of at least 8 carbon atoms are removed. Preferably, step (g) is continued until no additional $C_2$–$C_4$ alkylene glycol and/or alkanol of at least 8 carbon atoms is removed, i.e., distills in the overhead condenser.

In a preferred embodiment, it has been found that the addition of a demulsifier such as Triton X-45 and Triton X-100 may synergistically enhance the hydrolytic stability of the Group II metal overbased sulfurized alkylphenol. Triton X-45 and Triton X-100 are nonionic detergents useful as demulsifiers and are available from Rohm and Haas, Philadelphia, PA. These demulsifiers are ethoxylated p-octylphenols. Other suitable demulsifiers include Igepal CO-610 available from GAF Corporation, New York, NY. In one preferred embodiment, the demulsifier and sulfurization catalyst are combined. That is the aqueous solution contains calcium polysulfide and Triton X-100. Such a product is sold by Chevron Chemical Company, San Francisco, CA, under the trade name of ORTHORIX ®. Demulsifiers are generally added at from 0.1 to 1 weight percent to the alkylphenol, preferably at from 0.1 to 0.5 weight percent.

The oil-soluble, Group II metal overbased sulfurized alkylphenols produced by the process of this invention are useful lubricating oil additives imparting detergency and dispersancy properties to the lubricating oil as well as providing an alkalinity reserve in the oil. When employed in this manner, the amount of the oil-soluble, Group II metal overbased sulfurized alkylphenol ranges from about 0.5 to 40 weight percent of the total lubricant composition although preferably from about 1 to 25 weight percent of the total lubricant composition. Such lubricating oil compositions are useful in diesel engines, gasoline engines as well as in marine engines. When employed in marine engines, the oil-soluble, Group II metal overbased sulfurized alkylphenols are often used in conjunction with an oil-soluble, Group II metal overbased natural or synthetic hydrocarbyl sulfonate.

Such lubricating oil compositions employ a finished lubricating oil which may be single or multi-grade. Multigrade lubricating oils are prepared by adding viscosity index (VI) improvers. Typical viscosity index improvers are polyalkyl methacrylates, ethylene, propylene copolymers, styrene-diene copolymers, and the like. So-called decorated VI improvers having both viscosity index and dispersant properties are also suitable for use in the formulations of this invention.

The lubricating oil used in such compositions may be mineral oil or synthetic oils of viscosity suitable for use in the crankcase of an internal combustion engine such as gasoline engines and diesel engines which include marine engines. Crankcase lubricating oils ordinarily have a viscosity of about 1300 cSt 0° F. to 24 cSt at 210° F. (99° C.). The lubricating oils may be derived from synthetic or natural sources. Mineral oil for use as the base oil in this invention includes paraffinic, naphthenic and other oils that are ordinarily used in lubricating oil compositions. Synthetic oils include both hydrocarbon synthetic oils and synthetic esters. Useful synthetic hydrocarbon oils include liquid polymers of alpha-olefins having the proper viscosity. Especially useful are the hydrogenated liquid oligomers of $C_6$ to $C_{12}$ alpha-olefins such as 1-decene trimer. Likewise, alkyl benzenes of proper viscosity such as didodecyl benzene, can be used. Useful synthetic esters include the esters of both monocarboxylic acid and polycarboxylic acids as well as monohydroxy alkanols and polyols. Typical examples are didodecyl adipate, pentaerythritol tetracaproate, di-2-ethylhexyl adipate, dilaurylsebacate and the like. Complex esters prepared from mixtures of mono and dicarboxylic acid and mono and dihydroxy alkanols can also be used.

Blends of hydrocarbon oils with synthetic oils are also useful. For example, blends of 10 to 25 weight percent hydrogenated 1-decene trimer with 75 to 90 weight percent 150 SUS (100° F.) mineral oil gives an excellent lubricating oil base.

Other additives which may be present in the formulation include rust inhibitors, foam inhibitors, corrosion inhibitors, metal deactivators, pour point depressants, antioxidants, and a variety of other well-known additives.

The following examples are offered to specifically illustrate the invention. These examples and illustrations are not to be construed in any way as limiting the scope of the invention.

It is noted that two titrimeters were employed to measure the TBN of some of the examples herein. The TBN's reported herein were obtained from either titrimeter. The TBN's obtained from these two titrimeters were within 3-5% of each other. It is understood that the TBN values reported herein are believed to be accurate at ±5% TBN's obtained from both titrimeters are reported for some of the examples.

EXAMPLES

Example 1

Preparation of a $C_{18}$–$C_{30}$ Alkylphenol

To a 2-liter flask, equipped with stirrer, Dean Stark trap, condensor and nitrogen inlet and outlet was added 857 gms of a predominantly $C_{18}$ to $C_{30}$ olefin mixture (olefin content: $C_{16}$–0.5%; $C_{18}$–6.6; $C_{20}$–26.2%; $C_{22}$–27.7%; $C_{24}$–18.2%; $C_{26}$–9.0%; $C_{28}$–4.5%; $C_{30}$–28%; greater than $C_{30}$–4.5%) wherein in the entire olefin fraction, at least 30 mole percent of said olefins contain trisubstituted vinyl groups (available from Ethyl Corporation, Baton Rouge, LA), 720 gms phenol, 55 gms of a sulfonic acid cation exchange resin (polystyrene crosslinked with divinylbenzene) catalyst (Amberlyst 15 ® available from Rohm and Haas, Philadelphia, Pennsylvania). The reaction mixture was heated to about 145° C. for about 6 hours with stirring under a nitrogen atmosphere. The reaction mixture was stripped by heating under vacuum and the resulting product filtered hot over diatomaceous earth to afford 947 gms of a $C_{18}$–$C_{30}$ alkylphenol with a hydroxyl number of 118 and 56% para-alkylphenol content.

Example 2

Preparation of a $C_{20}$–$C_{28}$ Alkylphenol

To a 2-liter flask, equipped with stirrer, Dean Stark trap, condensor and nitrogen inlet and outlet was added 674 gms of a predominantly $C_{20}$ to $C_{28}$ olefin mixture (olefin content: $C_{18}$–2%; $C_{20}$–28%; $C_{22}$–19%; $C_{24}$–13%; $C_{26}$–21%; $C_{28}$–11%; and greater than $C_{30}$–6%) wherein in the entire olefin fraction at least 20 mole percent of said olefins contain vinylidine groups ($C_{20}$–$C_{24}$ olefins and $C_{24}$–$C_{28}$ olefins are available from Chevron Chemical Company, San Francisco, CA and are then physically mixed at an equal mole basis to provide a $C_{20}$–$C_{28}$ olefin mixture), 211.5 grams of phenol, 43 grams of a sulfonic acid cation exchange resin (polystyrene crosslinked with divinylbenzene) catalyst (Amerlyst 15 ® available from Rohm and Haas, Philadelphia, PA). The reaction mixture was heated to about 140° C. for about 8 hours with stirring under a nitrogen atmosphere. The reaction mixture was stripped by heating under vacuum and the product was filtered hot over a diatomaceous earth to afford 574 grams of a $C_{20}$–$C_{28}$ alkylphenol with a hydroxyl number of 110 and with 56% para-alkylphenol content.

Example 3

Preparation of Tetrapropenylphenol

To a 2-liter flask, equipped with stirrer, Dean-Stark trap, condensor, and nitrogen inlet and outlet was added 567 grams of tetrapropylene, 540 grams of phenol, 72 grams of a sulfonic acid cation exchange resin (polystyrene crosslinked with divinylbenzene) catalyst (Amberlyst 15 ® available from Rohm and Haas, Philadelphia, PA). The reaction mixture was heated to about 110° C. for about 3 hours with stirring under a nitrogen atmosphere. The reaction mixture was stripped by heating under vacuum and the resulting product filtered hot over diatomaceous earth to afford 626 grams of tetrapropenylphenol and with a hydroxyl number of 205 and with 96% para-alkylphenol content.

Example 4

Into a 0.5-liter 3-neck flask, equipped with stirrer, Dean-Stark trap, condensor, and nitrogen inlet and outlet was charged 100 grams of phenol. The system was heated to 55° C. and then charged with 55 grams of $C_{24}$–$c_{28}$ olefin, available from Chevron Chemical Company, San Francisco, CA, and 12.5 grams of Filtrol-13, an acid activated clay available from Filtrol Corporation, Los Angeles, CA. Afterwards, 130.5 grams of $C_{18}$–$C_{30}$ olefin, available from Ethyl Corp., Baton Rouge, LA, was added over 1 hour while heating the system from between 135° C. to 145° C. The reaction was stopped and filtered. The filtered produce was transferred to a clean flask, placed under vacuum (~50 mm Hg) and heated to 215° C. with a small nitrogen sweep. The nitrogen was shut off and the vacuum (~50 mm Hg) continued at 215° C. for 30 minutes to yield an alkylphenol having a hydroxyl number of 106.

Example 5

Preparation of Calcium Overbased Hydrocarbyl Sulfonate

A. Preparation of Sodium Hydrocarbyl Sulfonate

Into a reaction vessel is charged 646 grams of feedstock (solvent refined 500N lubricating oil which is a mixture of alkyl aromatics, napthenes and paraffins). At 75° F. 150.8 grams of oleum (~27.6% $SO_3$) is charged to the reaction vessel over a 10-minute addition period. The reaction temperature is allowed to rise—generally to about 100° F. Afterwards, 12.3 ml of water as well as 540 ml of Chevron 265 thinner, which is a mixture of aromatics, naphthenes and paraffins, is added to the system. The system is maintained at 150° F. for 1 hour. At this time, 125 ml of an aqueous solution containing 25% by weight sodium hydroxide is added to the system. The reaction is maintained at 150° F. for 1 hour. After settling, the aqueous layer is removed and the organic solution then is maintained for at least 1 hour. After this period, any additional aqueous layer which had settled out is also removed. The system is stripped at 350° F., atmospheric pressure with an air sweep to yield the sodium hydrocarbyl sulfonate which is purified as follows: The sodium hydrocarbyl sulfonate is dissolved in 330 ml of aqueous secondary butyl alcohol. 160 ml of an aqueous solution containing 4% by weight sodium chloride is added to the system. The system is heated to 150° F. and maintained at 150° F. for 2 hours. After settling, brine is removed. An additional 80 ml of an aqueous solution containing 4% by weight sodium chloride is added to the system. The system is heated to 150° F. and maintained at 150° F. for 1 hour. After settling, brine is removed. 220 ml of water is added to the system and the system heated to 150° F. The system is maintained at 150° F. for 1 hour. Afterwards, water and unsulfonated oil layer is removed leaving the aqueous secondary butyl alcohol solution containing the sodium hydrocarbyl sulfonate.

B. Preparation of Calcium Hydrocarbyl Sulfonate

To the aqueous secondary butyl alcohol solution containing the sodium hydrocarbyl sulfonate, produced as in A above, is added 550 ml of a solution containing water, secondary butyl alcohol and calcium chloride (~10% $CaCl_2$). The system is heated to 150° F. and is maintained at 150° F. for 1 hour. After settling, brine is removed. 340 ml of water and 170 ml of an aqueous solution containing 40% by weight calcium chloride is added to the system. The system is heated to 150° F. and is maintained at 150° F. for at least 1 hour. After settling, brine is removed. 340 ml of water and 170 ml of an aqueous solution containing 40% by weight calcium chloride is added to the system. The system is heated to 150° F. and is maintained at 150° F. for at least 1 hour. After settling, brine is removed. 340 ml of water is added to the system. The system is heated to 150° F. and is maintained at 150° F. for 1 hour. After settling, the aqueous layer is removed. An additional 340 ml of water is then added to the system. The system is heated to 150° F. and is maintained at 150° F. for 1 hour. After settling, the aqueous layer is removed. The aqueous secondary butyl alcohol solution is then stripped at elevated temperatures and reduced pressures to yield calcium hydrocarbyl sulfonate.

C. Preparation of Calcium Overbased Hydrocarbyl Sulfonate

Into a 500-ml 3-neck round bottom flask equipped with a mechanical stirrer, is added sufficient diluent oil to the calcium hydrocarbyl sulfonate, produced above, to yield 270 grams of a composition at 1.65% by weight calcium. 42.4 grams water and 10.8 grams calcium hydroxide are added to the system. A reflux condensor is attached to one side neck and a thermometer is attached to the other side neck of the 3-neck round bottom flask. The system is heated to reflux (~210° F.) and held there for at least 1 hour. The reaction system is then distilled by heating to a bottoms temperature of 330° F./atmospheric pressure. Afterwards, the temperature is raised to 400° F. under vacuum (~20 mm Hg). The system is then cooled to 300° F. and the vacuum is discontinued. 20 grams of diatomaceous earth is added to the product and the product filtered through a ¼-inch diatomaceous earth pad on a Buchner funnel, which is preheated prior to filtration to yield the title compound which is generally of approximately 16 Total Base Number.

Example 6

Preparation of 340 TBN Calcium Overbased Sulfurized Alkylphenol

Into a 2-liter, 4-neck flask was charged 196 grams of tetrapropenylphenol, prepared in a manner similar to Example 3, 354 grams of $C_{18}$–$C_{30}$ alkylphenol, prepared in a manner similar to Example 1, 410 grams of decyl alcohol, 20 grams of 2-mercaptobenzothiazole, 40 grams of a calcium overbased hydrocarbyl sulfonate, prepared in a manner similar to Example 5 and 200 grams of Cit-Con 100N oil. The system was heated with agitation at 90° C. at which time 296 grams of $Ca(OH)_2$ and 108 grams of sulfur were charged to the reaction system. The reaction system was then held at 90° C. for 45 minutes. Afterwards, the reaction temperature was raised over a 15-minute period to 150° C. whereupon 206 grams ethylene glycol was added over a 60-minute period via an addition funnel. After complete addition of ethylene glycol, the reaction temperature was increased to 160° C. over a 15-minute period and held at this temperature for 1 hour. At this time, the stirring rate of the reaction mixture was increased to moderately fast, and the reaction temperature was then increased at a rate of 5° C. per 20 minutes until the reaction temperature reached 175° C. whereupon 144 grams of carbon dioxide was charged through a flowmeter to the reaction system over a 3-hour period. The reaction temperature was then increased to 195° C. and the system stripped under vacuum (~10 mm of Hg) for a period of 30 minutes to yield 1269 grams of product which was purified by addition of 3 weight percent diatomaceous earth consisting of 50% Hi-Flo, and 50% of 512 Celite, commercial diatomaceous earth products available from Manville, Filtration and Minerals Division, Denver, CO, followed by filtration through a ¼-inch Celite pad on a Buchner funnel. The resulting product has a Total Base Number of 340 (324 on second titrimeter); a viscosity of 720 centistokes at 100° C.; a sulfur content of 4.4 weight percent; and a calcium content of 12.3 weight percent.

Example 7

Preparation of a 343 TBN Calcium Overbased Sulfurized Alkylphenol

Into a 10-gallon stainless steel reactor was charged 3.53 kilograms of tetrapropenylphenol, prepared in a manner similar to Example 3, 6.73 kilograms of $C_{18}$–$C_{30}$ alkylphenol, prepared in a manner similar to Example 1, 7.6 kilograms of decyl alcohol, 380 grams of 2-mercaptobenzothiazole, 760 grams of a calcium overbased hydrocarbyl sulfonate, prepared in a manner similar to Example 5 and 3.8 kilograms of Cit-Con 100N oil. The system was heated with agitation to 90° C. at which time 5.62 kilograms of $Ca(OH)_2$ and 2.05 kilograms sulfur were charged to the reaction system. The reaction system was then held at 90° C. for 45 minutes. Afterwards, the reaction temperature was raised over a 15-minute period to 150° C. whereupon 3.91 kilograms ethylene glycol was added over a 60-minute period via an addition flask. After complete addition of ethylene glycol, the reaction temperature was increased to 160°

C. and held at this temperature for 1 hour. At this time, the stirring rate of the reaction mixture was increased and the reaction temperature was then increased at a rate of 5° C. per 20 minutes until the reaction temperature reached 175° C. whereupon 2.74 kilograms of $CO_2$ was charged to the reaction system over a 3-hour period. The reaction temperature was then increased to 195° C. and the system stripped under vacuum (~10 mm of Hg) for a period of 30 minutes. The system was cooled overnight and then heated and agitated. The product was then purified by addition of 3 weight percent diatomaceous earth consisting of 50% Hi-Flo, and 50% of 512 Celite, commercial diatomaceous earth products available from Manville, Filtration and Minerals Division, Denver, CO, followed by filtration to yield a product having a Total Base Number of 343 (324 on second titrimeter); a viscosity of 463 centistokes at 100° C.; a sulfur content of 4.4 weight percent, a calcium content of 12.4 weight percent and 1.6% crude sediment.

Example 8

Into a 1-liter, 4-neck flask was added 99 grams of tetrapropenylphenol, prepared in a manner similar to Example 3, 167 grams of a $C_{20}$–$C_{28}$ alkylphenol, prepared in a manner similar to Example 2, 210 grams of decyl alcohol, 10 grams of 2-mercaptobenzothiazole, 20 grams of a calcium overbased hydrocarbyl sulfonate, prepared in a manner similar to Example 5 and 100 grams of Cit-Con 100N oil. The system was heated with agitation to 90° C. at which time 148 grams of $Ca(OH)_2$ and 56 grams of sublimed sulfur were charged to the reaction system. The reaction was then held at 90° C. for 45 minutes. Afterwards, the reaction temperature was raised over a 15-minute period to 150° C. whereupon 103 grams of ethylene glycol was added over a 60-minute period. After complete addition of the ethylene glycol, the reaction temperature was increased to 160° C. and held at this temperature for 1 hour. At this time, the reaction temperature was increased at a rate of 5° C. per 20 minutes until the reaction temperature reached 175° C. whereupon 72 grams of carbon dioxide was charged to the reaction system over a 3-hour period. The reaction temperature was then increased to 195° C. and the system stripped under vacuum (~10 mm of Hg) for a period of 30 minutes. Sediment was removed and 800 ml of 250 thinner which is a mixture of aromatics, paraffins and naphthenes was added to the system as well as 3 weight percent diatomaceous earth consisting of 50% Hi-Flo and 50% of 512 Celite, commercial diatomaceous earth products available from Manville, Filtration and Minerals Division, Denver, CO. The system was filtered through a ¼-inch Celite pad on a Buchner funnel. Afterwards, the thinner was removed by stripping at elevated temperatures and reduced pressures to yield 581 grams of a calcium overbased sulfurized alkylphenol having a Total Base Number of 328 (obtained from second titrimeter) a viscosity of 365 centistokes at 100° C.; a sulfur content of 3.96 weight percent; and a calcium content of 12.3 weight percent.

Example 9

Into a 1-liter, 4-neck flask was added 99 grams of tetrapropenylphenol, prepared in a manner similar to Example 3, 167 grams of a $C_{20}$–$C_{28}$ alkylphenol, prepared in a manner similar to Example 2, 210 grams of decyl alcohol, 10 grams of ORTHORIX® a commercially available calcium polysulfide product sold by Chevron Chemical Company, San Francisco, CA, 20 grams of a calcium overbased hydrocarbyl sulfonate, prepared in a manner similar to Example 5 and 100 grams of Cit-Con 100N oil. The system was heated with agitation to 90° C. at which time 148 grams of $Ca(OH)_2$ and 56 grams of sublimed sulfur were charged to the reaction system. The reaction was then held at 90° C. for 45 minutes. Afterwards, the reaction temperature was raised over a 15-minute period to 150° C. whereupon 103 grams of ethylene glycol was added over a 60-minute period. After complete addition of the ethylene glycol, the reaction temperature was increased to 160° C. and held at this temperature for 1 hour. At this time, the reaction temperature was increased at a rate of 5° C. per 20 minutes until the reaction temperature reached 175° C. whereupon 72 grams of carbon dioxide was charged to the reaction system over a 3-hour period. The reaction temperature was then increased to 195° C. and the system stripped under vacuum (~10 mm of Hg) for a period of 30 minutes. Sediment was removed and 800 ml of 250 thinner which is a mixture of aromatics, paraffins and naphthenes was added to the system as well as 3 weight percent diatomaceous earth consisting of 50% Hi-Flo, a commercial diatomaceous earth product available from Manville, Filtration and Minerals Division, Denver, CO, and 50% of 512 Celite, a commercial diatomaceous earth product available from Manville, Filtration and Minerals Division, Denver CO. The system was filtered through a ¼-inch Celite pad on a Buchner funnel. Afterwards, the thinner was removed by stripping at elevated temperatures and reduced pressures to yield 500 grams of a calcium overbased sulfurized alkylphenol having a Total Base Number of 344 (obtained from second titrimeter); a viscosity of 632 centistokes at 100° C.; a sulfur content of 3.31 weight percent; and a calcium content of 12.8 weight percent.

Example 10

Into a 2-liter, 4-neck flask was added 99 grams of tetrapropenylphenol, prepared in a manner similar to Example 3, 167 grams of a $C_{20}$–$C_{28}$ alkylphenol, prepared in a manner similar to Example 2, 210 grams of decyl alcohol, 10 grams of 2-mercaptobenzothiazole, 20 grams of calcium overbased hydrocarbyl sulfonate, prepared in a manner similar to Example 5 and 100 grams of Cit-Con 100N oil. The system was heated with agitation to 90° C. at which time 138 grams of calcined Dolomite, $Ca(OH)_2 \cdot Mg(OH)_2$, and 56 grams of sublimed sulfur were charged to the reaction system. The reaction was then held at 90° C. for 45 minutes. Afterwards, the reaction temperature was raised over a 15-minute period to 150° C. whereupon 103 grams of ethylene glycol was added over a 60-minute period. After complete addition of the ethylene glycol, the reaction temperature was increased to 160° C. and held at this temperature for 1 hour. At this time, the reaction temperature was increased at a rate of 5° C. per 20 minutes until the reaction temperature reached 175° C. whereupon 74 grams of carbon dioxide was charged to the reaction system over a 3-hour period. The reaction temperature was then raised to 195° C. and the system stripped under vacuum (~10 mm Hg) for a period of 30 minutes. Sediment was removed and 800 ml of Chevron 250 thinner, which is a mixture of aromatics, paraffins and naphthenes was added to the system as well as 3 weight percent diatomaceous earth consisting of 50%

Hi-Flo and 50% 512 Celite, which are commercial diatomaceous earth products available from Manville, Filtration and Minerals Division, Denver, CO. The system was filtered through a ¼-inch Celite pad on a Buchner funnel. Afterwards, the thinner was removed by stripping at elevated temperatures and reduced pressures to yield 280 grams of a calcium-magnesium overbased sulfurized alkylphenol having a Total Base Number of 294 (obtained from second titrimeter); a viscosity of 154 centistokes at 100° C.; a sulfur content of 3.65 weight percent; a calcium content of 7.62 weight percent; and a magnesium content of 2.14 weight percent.

Example 11

Into a 1-liter, 3-neck flask was added 104 grams of tetrapropenylphenol, prepared in a manner similar to Example 3, 187 grams of a mixture of $C_{18}$–$C_{30}$ and $C_{24}$–$C_{28}$ alkylphenol, prepared in a manner similar to Example 4, 105 grams of decyl alcohol, 10 grams of 2-mercaptobenzothiazole, 20 grams of calcium overbased hydrocarbyl sulfonate, prepared in a manner similar to Example 5, and 100 grams of Cit-con 100N oil. The system was heated with agitation to 90° C. at which time 148 grams of $Ca(OH)_2$ and 56 grams of sublimed sulfur were charged to the reaction system. The reaction was then held at 90° C. for 45 minutes. Afterwards, the reaction temperature was raised over a 15-minute period to 150° C. whereupon 103 grams of ethylene glycol was added over a 60-minute period. After complete addition of the ethylene glycol, the reaction temperature was increased to 160° C. and held at this temperature for 1 hour. At this time, the reaction temperature was increased at a rate of 5° C. per 20 minutes until the reaction temperature reached 175° C. whereupon 72 grams of carbon dioxide was charged to the reaction system over a 3-hour period. The reaction temperature was then raised to 195° C. and the system stripped under vacuum ($\sim$ 10 mm Hg) for a period of 30 minutes. Sediment was removed and 800 ml of Chevron 250 thinner, which is a mixture of aromatics, paraffins and naphthenes, was added to the system as well as 3 weight percent diatomaceous earth consisting of 50% of Hi-Flo and 50% 512 Celite, which are commercial diatomaceous earth products available from Manville, Filtration and Minerals Division, Denver, CO. The system was filtered through a ¼-inch Celite pad on a Buchner funnel. Afterwards, the thinner was removed by stripping at elevated temperatures and reduced pressures to yield 601 grams of a calcium overbased sulfurized alkylphenol having a Total Base Number of 349 (324 TBN on second titrimeter), a viscosity of 441 centistokes at 100° C.; a sulfur content of 4.27 weight percent; and a calcium content of 12.4 weight percent.

Example 12

Into a 1-liter, 3-neck flask was added 102 grams of tetrapropenylphenol, prepared in a manner similar to Example 3, 187 grams of a mixture of $C_{18}$–$C_{30}$ and $C_{24}$–$C_{28}$ alkylphenol, prepared in a manner similar to Example 4, 105 grams of decyl alcohol, 20 grams of 2-mercaptobenzothiazole, 20 grams of a polyisobutenyl succinimide dispersant composition [prepared by reacting 1 mole of polyisobutenyl succinic anhydride, where the polyisobutenyl group has a number average molecular weight of about 950, with 0.87 mole of tetraethylenepentaaimine; then diluting to about 50% actives with diluent oil—contains 2.1% nitrogen] and 100 grams of Cit-Con 100N oil. The system was heated with agitation to 90° C. at which time 148 grams of $Ca(OH)_2$ and 56 grams of sublimed sulfur were charged to the reaction system. The reaction was then held at 90° C. for 45 minutes. Afterwards, the reaction temperature was raised over a 15-minute period to 150° C. whereupon 103 grams of ethylene glycol was added over a 60-minute period. After complete addition of the ethylene glycol, the reaction temperature was increased to 160° C. and held at this temperature for 1 hour. At this time, the reaction temperature was increased at a rate of 5° C. per 20 minutes until the reaction temperature reached 175° C. whereupon 72 grams of carbon dioxide was charged to the reaction system over a 3-hour period. The reaction temperature was then raised to 195° C. and the system stripped under vacuum ($\sim$ 10 mm Hg) for a period of 30 minutes. Sediment was removed and 800 ml of Chevron 250 thinner which is a mixture of aromatics, paraffins and naphthenes, was added to the system as well as 3 weight percent diatomaceous earth consisting of 50% of Hi-Flo and 50% Celite, which are commercial diatomaceous earth products available from Manville, Filtration and Minerals Division, Denver, CO. The system was filtered through a ¼ inch Celite pad on a Buchner funnel. Afterwards, the thinner was removed by stripping at elevated temperatures and reduced pressures to yield a calcium overbased sulfurized alkylphenol having a Total Base Number of 352 (obtained from first titrimeter); a viscosity of 893 centistokes at 100° C.; a sulfur content of 4.02 weight percent; and a calcium content of 11.3 weight percent.

Example 13

In a mixer containing a hatch, a vent line, an overhead system connected to a vacuum line (jet), and a hotwell line, first vent the mixer overhead into the hotwell. Close the vapor line valve and then purge the mixer with a slight nitrogen draft. With heat sources turned off, add 357 gallons of a tetrapropenylphenol, prepared similarly to Example 3 above, heated at 180° F., and add 318 gallons of Cit-Con 100N oil, heated at 70° F. Add 630 gallons of a $C_{20}$–$C_{28}$ alkylphenol, prepared similarly to Example 2 above, heated at 150° F.; 70 gallons of a calcium overbased hydrocarbyl sulfonate, prepared similarly to Example 5 above, heated at 200° F.; and 866 gallons of decyl alcohol heated at 70° F.

Start agitation and then adjust the mixer's temperature to 150° F. After shutting off the nitrogen, open the hatch and charge 275 lbs of 2-mercaptobenzothiazole to the system and after closing the hatch, heat the system at 200° F. for 4 hours.

After insuring that the mixer is venting through the mixer to hotwell line, cool the system to 175° F. While agitating the system, add 4,010 lbs of hydrated lime. Open the vapor line to vent through the condensor, water receiver, to jets. Close the mixer-to-hotwell line, and adjust to 10 inches of Hg. vacuum. Heat to 260° F. Add 1,327 lbs sulfur, heated at 250° F. Heat to 300° F. over a period of 1 hour. At which time, add 274 gallons of ethylene glycol over a 60-minute period. The ethylene glycol addition is started very slowly and after complete addition of the ethylene glycol, heat the system to 335° F. over a period of 1 hour. Charge 1,680 lbs of carbon dioxide over 2 hours and 48 minutes. Upon carbon dioxide addition, allow the temperature to rise to 350° F.

After complete carbon dioxide addition, apply full vacuum—at least 28 inches of Hg. Heat to 400° F. Hold at these conditions for 30 minutes starting once 395° F. is reached. Thereupon cool to 350° F. and break vacuum with nitrogen adjusting to 5 psig to yield a calcium overbased sulfurized alkylphenol having a Total Base Number of 327 having a viscosity of 1375 centistokes at 100° C. and containing 12.3% calcium, 3.70% sulfur and 0.8% crude sediment. Filter through diatomaceous earth and dilute with 5 weight percent 130N oil to yield a calcium overbased sulfurized alkylphenol having a TBN of 312, a viscosity of 660 centistokes at 100° C. and containing 11.6% calcium, 3.32% sulfur and 0.02% sediment.

In a manner similar to Examples 6–13, the following sulfurization catalysts may be employed in place of either 2-mercaptobenzothiazole or calcium polysulfide to provide Group II metal overbased sulfurized alkylphenols: bis(2,2'-benzothiazolyl)disulfide; 2(3H)-benzothiazolethione zinc salt; 2-benzothiazolyl-N,N'-diethylthiocarbamyl sulfide; 4-morpholinyl-2-benzothiazole disulfide; zinc diisopropyl dithiophosphate; zinc di-n-butyldithiophosphate; zinc di-(2-ethylhexyl)dithiophosphate; N,N'-dibutylthiourea; ethylenethiourea; trimethylthiourea; dipentamethylenethiuram disulfide; dipentamethylenethiourea tetrasulfide; etc.

Comparative Example A (Compared to Examples 8 and 9)

Into a 1-liter, 4-neck flask was added 99 grams of tetrapropenylphenol, prepared in a manner similar to Example 3, 167 grams of a $C_{20}$–$C_{28}$ alkylphenol, prepared in a manner similar to Example 2, 210 grams of decyl alcohol, 20 grams of a calcium overbased hydrocarbyl sulfonate, prepared in a manner similar to Example 5 and 100 grams of Cit-Con 100N oil. The system was heated with agitation to 90° C. at which time 148 grams of $Ca(OH)_2$ and 56 grams of sublimed sulfur were charged to the reaction system. The reaction was then held at 90° C. for 45 minutes. Afterwards, the reaction temperature was raised over a 15-minute period to 150° C. whereupon 103 grams of ethylene glycol was added over a 60-minute period. After complete addition of the ethylene glycol, the reaction temperature was increased to 160° C. and held at this temperature for 1 hour. At this time, the reaction temperature was increased at a rate of 5° C. per 20 minutes until the reaction temperature reached 175° C. whereupon 72 grams of carbon dioxide was charged to the reaction system over a 3-hour period. The reaction temperature was then increased to 195° C. and the system stripped under vacuum (~10 mm of Hg) for a period of 30 minutes. Sediment was removed and 800 ml of 250 thinner which is a mixture of aromatics, paraffins and naphthenes was added to the system as well as 3 weight percent diatomaceous earth consisting of 50% Hi-Flo, a commercial diatomaceous earth product available from Manville, Filtration and Minerals Division, Denver, CO, and 50% of 512 Celite, a commercial diatomaceous earth product available from Manville, Filtration and Minerals Division, Denver, CO. The system was filtered through a ¼-inch Celite pad on a Buchner funnel. Afterwards, the thinner was removed by stripping at elevated temperatures and reduced pressures to yield 377 grams of a calcium overbased sulfurized alkylphenol having a Total Base Number of 296; a viscosity of 667 centistokes at 100° C; a sulfur content of 3.28 weight percent (average of 2 runs); and a calcium content of 11.6 weight percent.

Comparative Example B (Compared to Example 11)

Into a 1-liter, 3-neck flask was added 102 grams of tetrapropenylphenol, prepared in a manner similar to Example 3, 187 grams of a mixture of $C_{18}$–$C_{30}$ and $C_{24}$–$C_{28}$ alkylphenol prepared in a manner similar to Example 4, 105 grams of decyl alcohol, 20 grams of calcium overbased hydrocarbyl sulfonate, prepared in a manner similar to Example 5 and 100 grams of Cit-Con 100N oil. The system was heated with agitation to 90° C. at which time 148 grams of hydrated lime, $Ca(OH)_2$, and 56 grams of sublimed sulfur were charged to the reaction system. The reaction was then held at 90° C. for 45 minutes. Afterwards, the reaction temperature was raised over a 15-minute period to 150° C. whereupon 103 grams of ethylene glycol was added over a 60-minute period. After complete addition of the ethylene glycol, the reaction temperature was increased to 160° C. and held at this temperature for 1 hour. At this time, the reaction temperature was increased at a rate of 5° C. per 20 minutes until the reaction temperature reached 175° C. whereupon 72 grams of carbon dioxide was charged to the reaction system over a 3-hour period. The reaction temperature was then raised to 195° C. and the system stripped under vacuum (~10 mm Hg) for a period of 30 minutes. Sediment was removed and 800 ml of Chevron 250 thinner, which is a mixture of aromatics, paraffins and naphthenes, was added to the system as well as 3 weight percent diatomaceous earth consisting of 50% Hi-flo and 50% 512 Celite, which are commercial diatomaceous earth products available from Manville, Filtration and Minerals Division, Denver, CO. The system was filtered through a ¼-inch Celite pad on a Buchner funnel. Afterwards, the thinner was removed by stripping at elevated temperatures and reduced pressures to yield 525 grams of a calcium overbased sulfurized alkylphenol having a Total Base Number of 329 (327 on a second titrimeter), a viscosity of 1190 centistokes at 100° C.; a sulfur content of 3.75 weight percent; a calcium content of 12.2 weight percent and a crude sediment of 5.2 weight percent.

Comparative Example C (Compared to Example 12)

Into a 1-liter, 3-neck flask was added 102 grams of tetrapropenylphenol, prepared in a manner similar to Example 3, 187 grams of a mixture of $C_{18}$–$C_{30}$ and $C_{24}$–$C_{28}$ alkylphenol, prepared in a manner similar to Example 4, 105 grams of decyl alcohol, 20 grams of a polyisobutenyl succinimide dispersant composition [prepared by reacting 1 mole of polyisobutenyl succinic anhydride, where the polyisobutenyl group has a number average molecular weight of about 950, with 0.87 mole of tetraethylene pentaamine; then diluting to about 50% actives in diluent oil—contains 2.1% nitrogen] and 100 grams of Cit-Con 100N oil. The system was heated with agitation to 90° C. at which time 148 grams of hydrated lime, $Ca(OH)_2$, and 56 grams of sublimed sulfur were charged to the reaction system. The reaction was then held at 90° C. for 45 minutes. Afterwards, the reaction temperature was raised over a 15-minute period to 150° C. whereupon 103 grams of ethylene glycol was added over a 60-minute period. After complete addition of the ethylene glycol, the reaction temperature was increased to 160° C. and held at this temperature for 1 hour. At this time, the reaction temperature was increased at a rate of 5° C. per 20 minutes until the reaction temperature reached 175° C. whereupon 72 grams of carbon dioxide was charged to the reaction system over a 3-hour period. The reaction temperature was then raised to 195° C. and the system stripped under vacuum (~10 mm Hg) for a period of 30 minutes. Sediment was removed and 800 ml of Chevron 250 thinner, which is a mixture of aromatics, paraffins and naphthenes, was added to the system as well as 3 weight percent diatomaceous earth consisting of 50% Hi-Flo and 50% 512 Celite, which are commercial diatomaceous earth products available from Manville, Filtration and Minerals Division, Denver, CO. The system was filtered through a ¼-inch Celite pad on a Buchner funnel. Afterwards, the thinner was removed by stripping at elevated temperatures and reduced pressures to yield a calcium overbased sulfurized alkylphenol having a Total Base Number of 331 (on first titrimeter), a viscosity of 907 centistokes at 100° C.; a sulfur content of 3.94 weight percent; and a calcium content of 10.3 weight percent.

Comparative Example D (Compared to Example 6)

Into a 2-liter, 4-neck flask was charged 104 grams of tetrapropenylphenol, prepared in a manner similar to Example 3, 178 grams of $C_{18}$–$C_{30}$ alkylphenol, prepared in a manner similar to Example 1, 105 grams of decyl alcohol, 20 grams of a calcium overbased hydrocarbyl sulfonate, prepared in a manner similar to Example 5 and 100 grams of Cit-Con 100N oil. The system was heated with agitation at 90° C. at which time 148 grams of Ca(OH)$_2$ and 56 grams of sublimed sulfur were charged to the reaction system. The reaction system was then held at 90° C. for 45 minutes. Afterwards, the reaction temperature was raised over a 15-minute period to 150° C. whereupon 103 grams of ethylene glycol was added over a 60-minute period via an addition funnel. After complete addition of ethylene glycol, the reaction temperature was increased to 160° C. over a 15-minute period and held at this temperature for 1 hour. At this time, the stirring rate of the reaction mixture was increased to moderately fast, and the reaction temperature was then increased at a rate of 5° C. per 20 minutes until the reaction temperature reached 175° C. whereupon 72 grams of carbon dioxide was charged through a flowmeter to the reaction system over a 3-hour period. The reaction temperature was then increased to 195° C. and the system stripped under vacuum (~10 mm Hg) for a period of 30 minutes to yield 608 grams of product which was purified by addition of 3 weight percent of diatomaceous earth consisting of 50% Hi-Flo and 50% Celite 512, commercial diatomaceous earth products available from Manville, Filtration and Minerals Division, Denver, CO, followed by filtration through a ¼-inch Celite paid on a Buchner funnel. The resulting product has a total base number of 336 (335 TBN on second titrimeter); a viscosity of 1323 centistokes at 100° C.; a sulfur content of 3.95%; and a calcium content of 12.5%.

Table I below illustrates the side-by-side comparison of some of the Examples with the Comparative Examples.

TABLE I

|  | Catalyst | TBN | Viscosity (100° C.) | Weight % Sulfur | Weight % Calcium | Crude Sediment |
|---|---|---|---|---|---|---|
| Example 8 | MBT | 328[B] | 365 Centistokes | 3.96 | 12.3 | 1.2% |
| Example 9 | ORTHORIX ® | 344[B] | 632 Centistokes | 3.31 | 12.8 | 4% |
| Comparative Example A | None | 296[B] | 667 Centistokes | 3.28 | 11.6 | 7.2% |
| Example 11 | MBT | 349[A] | 441 Centistokes | 4.27 | 12.4 | 2.8% |
| Comparative Example B | None | 329[A] | 1190 Centistokes | 3.75 | 12.2 | 5.2% |
| Example 12 | MBT | 352[A] | 893 Centistokes | 4.02 | 11.3 | 2.8% |
| Comparative Example C | None | 331[A] | 907 Centistokes | 3.94 | 10.3 | 3.2% |
| Example 6 | MBT | 340[B] | 720 Centistokes | 4.4 | 12.3 | 1.4% |
| Comparative Example D | None | 336[B] | 1323 Centistokes | 3.95 | 12.5 | 2.4% |

[A]TBN value from the first titrimeter
[B]TBN value from the second titrimeter

Table I demonstrates that, under similar conditions, use of a sulfurization catalyst generally results in a higher TBN product of lower viscosity, and with lower crude sediment than is available without use of a sulfurization catalyst.

In Tables II and III below, Examples 14–17 further illustrate high TBN, low viscosity products of this invention. These products were prepared similarly to Examples 6–13 above.

TABLE II

| Ex.* | AP | lime/AP mole ratio | sulfur/AP mole ratio | Catalyst | grams of catalyst | CO$_2$/AP mole ratio | grams of decyl alcohol | ethylene glycol/AP mole ratio |
|---|---|---|---|---|---|---|---|---|
| 14 | A | 2.7 | 2.07 | MBT | 10 | 2.21 | 210 | 2.01 |
| 15 | A | 2.7 | 2.36 | MORFAX[1] | 10 | 2.21 | 210 | 2.24 |
| 16 | A | 2.7 | 2.36 | ORTHORIX ®[2] | 10 | 2.21 | 210 | 2.24 |

TABLE II-continued

| Ex.* | AP | lime/AP mole ratio | sulfur/AP mole ratio | Catalyst | grams of catalyst | $CO_2$/AP mole ratio | grams of decyl alcohol | ethylene glycol/AP mole ratio |
|---|---|---|---|---|---|---|---|---|
| 17 | B | 2.7 | 2.36 | MBT | 10 | 2.21 | 105 | 2.24 |

*Examples 14–17 were all conducted employing 20 grams of a calcium overbased hydrocarbyl sulfonate and 100 grams of Cit-Con 100N oil.
AP = alkylphenol
A = 0.74 mole of total alkylphenol (0.37 mole tetrapropenylphenol and 0.37 mole - 166 gm - $C_{20}$–$C_{28}$ alkylphenol)
B = 0.74 mole of total alkylphenol (0.37 mole tetrapropenylphenol and 0.37 mole - 178 gm - $C_{18}$–$C_{30+}$ alkylphenol)
[1]Morfax = a commercial formulation of R.T. Vanderbiilt Co., Norwalk, CT, which contains 2-(4-morpholinyldithio)benzothiazole
[2]ORTHORIX ® = a commercial formulation of Chevron Chemical Company, San Francisco, CA, which contains 25% by weight calcium polysulfide, 65% by weight water, 10% by weight of Triton X-45 - a commercially available demulsifier available from Rohm and Haas, Philadelphia, PA and a foam inhibitor

TABLE III

| | TBN | Viscosity (100° C.) | Weight % Sulfur | Weight % Calcium | Crude Sediment |
|---|---|---|---|---|---|
| Ex. 14[C] | 338 | 561 ± 28 | 4.3 | 12.2 | 2.8 |
| Ex. 15 | 324 | 360 | 3.74 | 12.4 | 2.0 |
| Ex. 16 | 337 | 501 | 3.49 | 12.7 | 2.0 |
| Ex. 17 | 331 | 424 | 4.1 | 12.7 | 1.6 |

[C]after a 3% dilution with Cit-Con 100N.

High TBN (>300 TBN) Group II metal overbased sulfurized alkylphenols produced by the process of this invention are characterized by containing at least about 90% and preferably at least 95% of Group II metal sulfurized alkylphenols in the actives and no more than about 10% and preferably no more than about 5% of Group II metal unsulfurized alkylphenols in the actives. Prior art Group II metal overbased sulfurized alkylphenols of 300+ TBN contain significantly more than 10% of Group II metal unsulfurized alkylphenol in the actives. Prior art compositions can be prepared either by a one step process as in Comparative Examples A-D above or in a two step process as shown in Comparative Example E below.

Comparative Example E

STEP 1 — Formation of Sulfurized Alkylphenol Calcium Salt

Into a 3-liter, 3-neck flask was added 529 grams of tetrapropenylphenol, prepared in a manner similar to Example 3. 274 grams of a $C_{18}$–$C_{30}$ alkylphenol, prepared in a manner similar to Example 1, 250 grams of Cit-Con 100N. The system was heated to 90° C. and 50 grams of $Ca(OH)_2$ and 112.5 grams of sublimed sulfur were added. The system was heated to 175° C. and 32.5 grams of ethylene glycol was added over 30 minutes. The system was held at 175° C. for 1 hour and then vacuum (~10 mm Hg) was applied for 4 hours to strip the ethylene glycol. 127.5 grams of $C_{15}$–$C_{18}$ alpha olefin derived from cracked wax was added at 135° C. along with 122.5 grams of Cit-Con 100N and the system heated for 8 hours under nitrogen. The product was filtered through a 50—50 mixture of Hi-Flo and Celite 512, diatomaceous earth products available from Manville, Filtration and Minerals Division, Denver, CO, to give 1351 grams of product with a Total Base Number of 63 containing 1.94 weight percent of calcium and 4.47 weight percent of sulfur.

STEP 2 — Formation of Overbased Sulfurized Alkylphenol Calcium Salt

Into a 1-liter, 3-neck flask was added 380 grams of the product prepared in Step 1, 20 grams of a polyisobutenyl succinimide dispersant composition [prepared by reacting 1 mole of polyisobutenyl succinic anhydride, where the polyisobutenyl group has a number average molecular weight of 950, with 0.87 mole of tetraethylene pentaamine, then diluting to about 50% actives with diluent oil], 48 grams of decyl alcohol and the system was heated to 90° C.; 106 grams of $Ca(OH)_2$ was added while the system was heated to 150° C. Ethylene glycol, 74.5 grams, was slowly added and the system heated to 175° C. Carbon dioxide, 61 grams, was added over a period of 4 hours. The product was stripped under vacuum (~10 mm Hg) at 190° C., filtered through a 50—50 mixture of Hi-Flo and Celite 512, diatomaceous earth products available from Manville, Filtration and Minerals Division, Denver, CO, to yield 485 grams of a calcium overbased sulfurized alkylphenol having a Total Base Number of 334, a viscosity of 2405 centistokes at 100° C.; a sulfur content of 2.7 weight percent; and a calcium content of 12.1 weight percent.

The compositions of this invention as well as prior art compositions were analyzed by the following dialysis and $^1$H-NMR technique (Example 18) to determine the content of Group II metal sulfurized alkylphenol as well as unsulfurized Group II metal alkylphenol.

Example 18

The compositions of this invention as well as prior art compositions are analyzed in the following manner. The Group II metal overbased sulfurized alkylphenol additive (50 grams) is weighed into an acetone-rinsed dialysis bag (Ramses No. 18 prophylactic bag). The bag is suspended in a 2-liter beaker containing 1.5 liters of 60 volume percent of methyl ethyl ketone (MEK), and 40 volume percent t-butanol. The solution is stirred with a magnetic stirrer at ambient temperature. The solution is changed every 24 hours for 7 days. The combined dialyzate solutions are stripped using a rotary evaporator and finally at 1 mm Hg vacuum at 85° C. to yield a product which is weighed. This product contains diluent oil (Cit-Con 100N) and unsulfurized alkylphenol starting material as determined by $^1$H-NMR in hexamethylphosphoramide (HMPA) solvent. In this solvent the unsulfurized alkylphenol shows peaks in the $^1$H-NMR at 10.00 to 10.11 ppm relative to tetramethylsilane (TMS) added as an internal standard. The alkylphenols of Examples 1–4 show this $^1$H-NMR peak and so it is diagnostic for unsulfurized alkylphenol.

The solid residue in the dialysis bag is weighed. This residue contains greater than 95 percent of all the calcium (or other Group II metal) in the original Group II metal overbased sulfurized alkylphenol preparations and is referred to as the "actives". This residue or "actives" contains the calcium sulfurized overbased alkylphenol and any unsulfurized calcium alkylphenol. The composition of the "actives" is determined by the following analysis. The "actives" are dissolved in mixed hexanes and then treated with 100 ml of concentrated hydrochloric acid in 100% ethanol. After the hydrochloric acid addition the mixture is stirred for 1 hour at ambient temperature to effect complete decalcification of the "actives". The liberated sulfurized alkylphenol and in some cases the unsulfurized alkylphenol are obtained by water washing the hexane solution; washing the hexane solution with 10 percent aqueous sodium bicarbonate; and then stripping the hexane solution at 120 mm Hg at 80°-85° C. to yield the decalcified "actives" product which are analyzed by $^1$H-NMR in hexamethylphosphoramide (HMPA) as solvent containing TMS as internal standard. The unsulfurized alkylphenol shows a peak at 10.00 to 10.11 and is referred to as the $S_0$ peak. The sulfurized alkylphenols show peaks at 10.40-10.50 for the monosulfide bridged alkylphenols and is referred to as the $S_1$ peak. The sulfurized alkylphenols also show peaks at 10.90 to 11.00 for the disulfide bridged alkylphenols and is referred to as the $S_2$ peak. The areas for these peaks are obtained by integration on a Varian T60 or a General Electric QE-300 MHz NMR spectrometer. The integrated areas are converted to mole percents by dividing the $S_1$ and $S_2$ integrated peak area by two (assuming dimeric structures).

As used herein and described above, the term "actives" is a measure of the amount of the Group II metal unsulfurized alkylphenol and the Group II metal sulfurized alkylphenol contained in the composition which can be determined by this procedure as well as other standard analytical techniques.

TABLE IV

ANALYSIS OF ACTIVES OBTAINED FROM EXAMPLE 18

| | Mole Percent of actives as | | | | Viscosity |
|---|---|---|---|---|---|
| | $S_0^{(1)}$ | $S_1^{(2)}$ | $S_2^{(3)}$ | TBN | (cSt-100° C.) |
| Example 11 | 0 | 30 | 70 | 349 | 441 |
| Comparative Example B | 26 | 17 | 57 | 333 | 538 |
| Example 12 | 0 | 34 | 66 | 352 | 893 |
| Comparative Example C | 31 | 24 | 45 | 331 | 907 |
| Comparative Example E | 30 | 24 | 46 | 334 | 2,405 |

$^{(1)}S_0$ = mole percent of calcium (unsulfurized alkylphenol)
$^{(2)}S_1$ = mole percent of calcium (monosulfide alkylphenol)
$^{(3)}S_2$ = mole percent of calcium (disulfide alkylphenol)

Table V below establishes that Group II metal unsulfurized alkylphenol content is detrimental to a Group II metal overbased sulfurized alkylphenol composition. In particular, as shown in this table, the calcium salt of the alkylphenol of Example 3 is extremely viscous and accordingly, if present in significant amounts, it will significantly increase the viscosity of the Group II metal overbased sulfurized alkylphenol composition. Likewise, the calcium salt of the alkylphenol of Example 4, while being much less viscous than the calcium salt of the alkylphenol of Example 3, does not contribute much to the Total Base Number of the composition. Accordingly, if present in significant amounts, it will significantly decrease the Total Base Number of the Group II metal overbased sulfurized alkylphenol composition. On the other hand, the Group II metal overbased sulfurized alkylphenols of this invention contain little if any of the unsulfurized Group II metal alkylphenols and accordingly possess a high Total Base Number and an acceptable viscosity. The results of Example 6 are included for illustrative purposes.

TABLE V

| | TBN | Viscosity (100° C.) |
|---|---|---|
| calcium salt of the $^{(a)}$ alkylphenol of Ex. 3 | 211 | too viscous to measure |
| 50% dilution with Cit-Con 100N | 105 | 112 centistokes |
| calcium salt of the $^{(a)}$ alkylphenol of Ex. 4 (represents approx. 50% conversion) | 54 | 18 centistokes |
| Example 11 | 349 | 441 centistokes |

$^{(a)}$ prepared by reacting the alkylphenol with excess hydrated lime (0.66 eq.) in ethylene glycol at 175° C.

Example 19

A formulated oil containing a Group II metal overbased sulfurized alkylphenol produced by the process of the invention was tested in a Sequence V-D Test method (according to candidate test for ASTM). This procedure utilizes a Ford 2.3-liter, four-cylinder Pinto engine. The test method simulates a type of severe field test service characterized by a combination of low speed, low temperature "stop and go" city driving and moderate turnpike operation. The effectiveness of the additives in the oil is measured in terms of the protection against sludge and varnish deposits on a 0 to 10 scale with 0 being black and 10 indicating no varnish or sludge deposits. The results are indicated in Table VI.

Sequence V-D test was run using a product prepared similarly to that described in Examples 6 and 7. These products were compared to a 250 TBN commercial calcium sulfurized alkylphenol prepared from alkylphenol described in Example 3.

The compositions of the formulated oils were: 5.25% of a bis-polyisobutenyl succinimide; 20 millimoles per kilogram of an overbased hydrocarbyl sulfonate as described in Example 5; 20 millimoles per kilogram of a 320 TBN hydrocarbyl sulfonate, 82 millimoles per kilogram of the product prepared similarly to Examples 6 and 7, 20 millimoles per kilogram of a zinc dithiophosphate; 20% of a commercial viscosity index improver in 150N/600N Exxon base oil—85% by weight 150N and 15% by weight 600N.

The comparative reference formulation used the same formulation as above with the exception that 82 millimoles per kilogram of a commercial 250 TBN phenate prepared from the alkylphenol described in Example 3 was used instead of the high TBN phenate prepared similarly to Examples 6 and 7.

TABLE VI

SEQUENCE V-D RESULTS

| Formulation containing the Phenate of | AS[1] | Deposit AV[2] | PV[3] |
|---|---|---|---|
| Prior Art (run in 1983) | 8.3[4] | 7.9[4] | 7.9[4] |
| (run in 1984) | 8.9 | 8.0 | 8.0 |
| (run in 1985) | 8.9 | 7.7 | 8.0 |
| High TBN Phenate prepared similarly to Examples 6 and 7[5] (Run in 1985) | 9.6 | 9.0 | 8.8 |

[1]average sludge
[2]average varnish
[3]piston varnish
[4]average of 6 runs
[5]average of 2 runs

Example 20

Compositions prepared by the method of the instant invention were analyzed for their hydrolytic stability in a modified ASTM D2619 test. Test compositions were first prepared by adding into a tared 400-ml flask 35 TBN of a Group II metal overbased sulfurized alkylphenol; 8 millimoles per kilogram (based on calcium content) of an overbased calcium hydrocarbyl sulfonate prepared in a manner similar to Example 5; 9 millimoles per kilogram (based on phosphorous content) of a zinc dihydrocarbyl dithiophosphate; and sufficient Cit-Con 30N lubricating oil to make 200 grams of the test composition.

The test compositions were heated and stirred at approximately 150° C. for about 30 minutes. Afterwards, each of the test compositions was divided into two samples. 95 grams of the test composition was then combined with 5 grams water and the resulting sample placed into a bottle for 24 hours at 93° C. Each sample was then placed in a 14209 Delaval Centrifuge and spun down at 10,000 g for 20 minutes. The oil layer was decanted and the Total Base Number (TBN) was measured for both the original sample and the test sample. The difference in TBN from the original sample to the test sample is a measure of the hydrolytic instability of the composition. Greater TBN loss means greater hydrolytic instability. Results of this test are shown below in Table VII below.

TABLE VII
HYDROLYTIC STABILITY

| Formulation Containing the Phenate of | % $S_0$ in the Actives of the Phenate | % TBN Loss |
| --- | --- | --- |
| Prior Art | 35 | 39 |
| Example 7 | 0 | 8 |
| Example 8 | 4 | 19 |

As shown above, the $S_0$ content in the actives of the phenate correlates to the hydrolytic instability of the composition, that is, phenates containing large amounts of $S_0$ content in the active are much less hydrolytically stable than phenates containing little or no $S_0$ content.

What is claimed is:

1. A method for preparing a Group II metal overbased sulfurized alkylphenol which comprises reacting in an inert diluent an alkylphenol, wherein the alkyl group contains a sufficient number of carbon atoms to render oil-soluble the resulting Group II metal overbased sulfurized alkylphenol, sulfur, a Group II metal oxide, hydroxide or $C_1$-$C_6$ alkoxide, a $C_2$-$C_4$ alkylene glycol, an alkanol of at least 8 carbon atoms and a compound selected from an oil-soluble Group II metal overbased hydrocarbyl sulfonate and an alkenyl succinimide, in the presence of a sulfurization catalyst, followed by reaction with carbon dioxide.

2. A method of claim 1 wherein the alkyl group of the alkylphenol contains from 25 to 100 mole percent predominantly straight-chain alkyl groups of from 15 to 35 carbon atoms and from 75 to 0 mole percent of the alkyl groups are polypropenyl of from 9 to 18 carbon atoms.

3. A method of claim 1 wherein the alkanol of at least 8 carbon atoms is decyl alcohol and the $C_2$-$C_4$ alkylene group is ethylene glycol.

4. A method of claim 3 wherein the Group II metal oxide, hydroxide or $C_1$-$C_6$ alkoxide is selected from the group consisting of calcium, barium and magnesium oxide, hydroxide or $C_1$-$C_6$ alkoxide, and mixtures thereof.

5. A method of claim 4 wherein the Group II metal oxide, hydroxide or $C_1$-$C_6$ alkoxide is calcium hydroxide.

6. A method of claim 4 wherein the Group II metal oxide hydroxide or $C_1$-$C_6$ alkoxide is Dolomite, i.e., $Ca(OH)_2 \cdot Mg(OH)_2$.

7. A method of claim 4 wherein the sulfurization catalyst is selected from 2-mercaptobenzothiazole and derivatives thereof, zinc dihydrocarbyl dithiophosphates wherein each hydrocarbyl is independently selected such that the dihydrocarbyl group contains from 6 to 30 carbon atoms, thioureas, thiurams, and calcium polysulfide.

8. A method of claim 7 wherein the sulfurization catalyst is selected from 2-mercaptobenzothiazole and derivatives thereof.

9. A method of claim 8 wherein the sulfurization catalyst is selected from the group consisting of 2-mercaptobenzothiazole, bis(2,2'-benzothiazolyl)disulfide, 2(3H)-benzothiazolethione zinc salt, 2-benzothiazolyl-N,N'-diethylthiocarbamyl sulfide, 4-morpholenyl-2-benzothiazole disulfide.

10. A method of claim 7 wherein the sulfurization catalyst is a zinc dihydrocarbyl dithiophosphate wherein each hydrocarbyl is independently selected such that the dihydrocarbyl group contains from 6 to 30 carbon atoms.

11. A method of claim 7 wherein the sulfurization catalyst is calcium polysulfide.

* * * * *